No. 754,980. PATENTED MAR. 22, 1904.
G. S. DUNN.
SYSTEM OF SPEED REGULATION FOR MOTOR DRIVEN MACHINERY.
APPLICATION FILED AUG. 20, 1903.
NO MODEL. 3 SHEETS—SHEET 1.
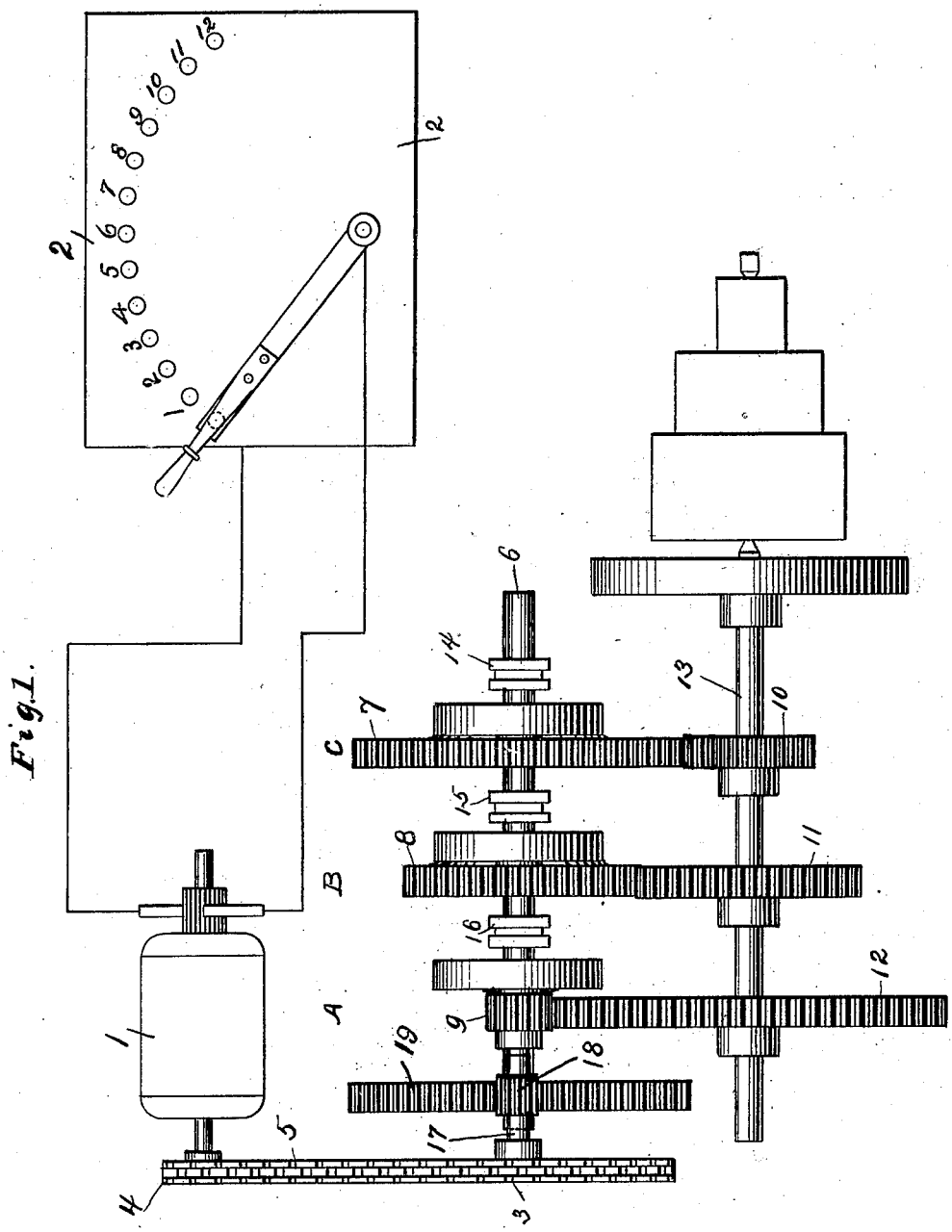

No. 754,980. PATENTED MAR. 22, 1904.
G. S. DUNN.
SYSTEM OF SPEED REGULATION FOR MOTOR DRIVEN MACHINERY.
APPLICATION FILED AUG. 20, 1903.
NO MODEL. 3 SHEETS—SHEET 2.
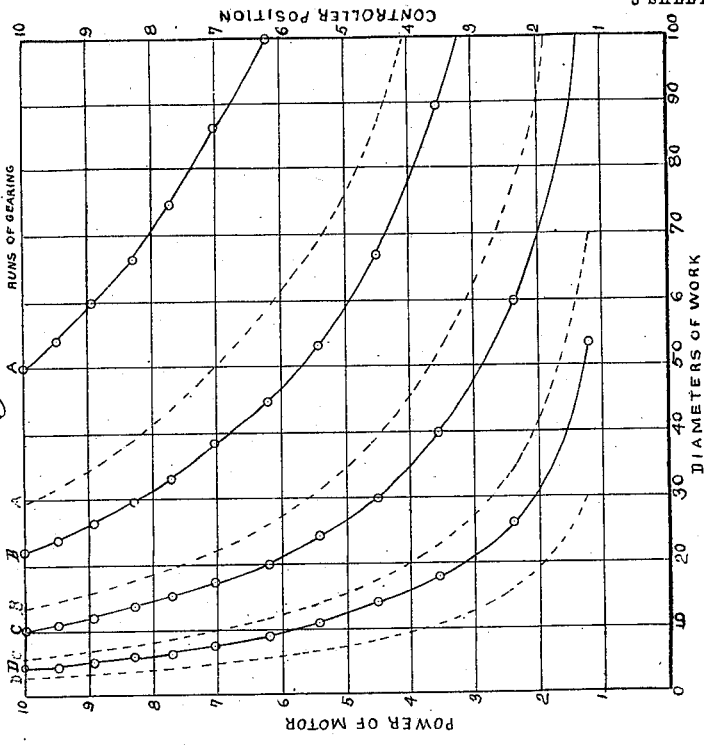
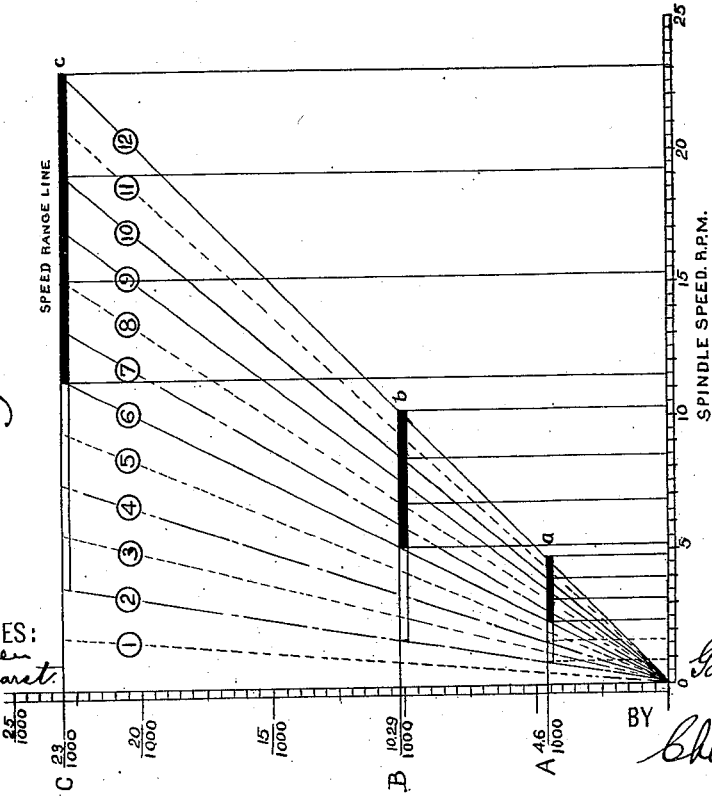

No. 754,980. PATENTED MAR. 22, 1904.
G. S. DUNN.
SYSTEM OF SPEED REGULATION FOR MOTOR DRIVEN MACHINERY.
APPLICATION FILED AUG. 20, 1903.
NO MODEL. 3 SHEETS—SHEET 3.
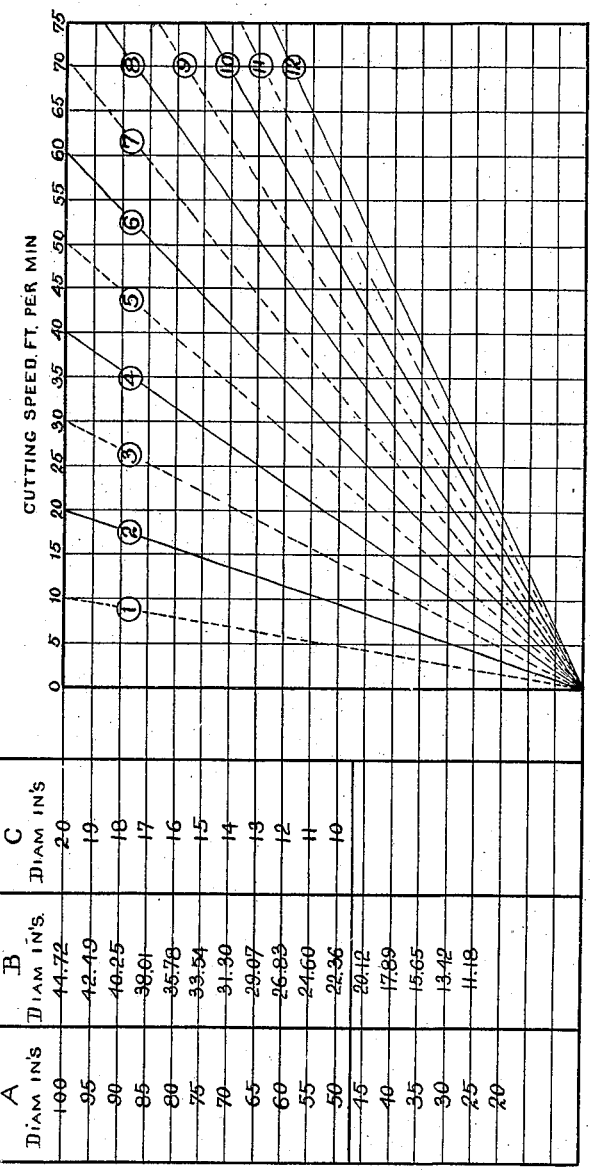

No. 754,980. Patented March 22, 1904.

UNITED STATES PATENT OFFICE.

GANO S. DUNN, OF EAST ORANGE, NEW JERSEY, ASSIGNOR TO CROCKER-WHEELER COMPANY, OF AMPERE, NEW JERSEY, A CORPORATION OF NEW JERSEY.

SYSTEM OF SPEED REGULATION FOR MOTOR-DRIVEN MACHINERY.

SPECIFICATION forming part of Letters Patent No. 754,980, dated March 22, 1904.

Application filed August 20, 1903. Serial No. 170,225. (No model.)

*To all whom it may concern:*

Be it known that I, GANO S. DUNN, a citizen of the United States of America, and a resident of East Orange, county of Essex, and State of New Jersey, have invented certain new and useful Improvements in Systems of Speed Regulation for Motor-Driven Machinery, of which the following is a specification.

My invention relates to a system of speed regulation for motor-driven machinery; and it is designed especially to meet the speed and power requirements of motor-driven machine-tools, such as lathes and boring-mills, where each machine is driven by a separate motor.

The introduction of direct-connected individual motors for driving machine-tools has brought about several problems to be solved, owing to the greatly-increased possibilities of such combinations and to certain peculiarities of electric motors.

The speed and power requirements for machine-tools—such as lathes, boring-mills, drilling-machines, &c.—are controlled by changes in the diameter of the work, changes in the cutting speed, and changes in the size—*i. e.*, the depth and width of the cut. The maximum size of the cut is limited by the amount that the cutting-tool will stand. The cutting speed is measured by the distance through which the tool passes in a given time, usually in feet per minute. The practical maximum limit of the cutting speed, assuming that the machine has been properly proportioned to withstand the stress of cutting, is fixed by the heat produced by the cutting. The pressure exerted against the tool or the resistance at the point of cutting is proportional to the depth and width—*i. e.*, the size of the cut. Since the work performed in cutting is equal to the pressure exerted upon the tool multiplied by the space through which the tool passes, the power or rate at which the work is done is equal to the cutting speed multiplied by this pressure, and since this pressure is proportional to the size of the cut the power required is proportional to the cutting speed multiplied by the size—*i. e.*, the depth and width of the cut. Since the cutting speed may be maintained the same for different diameters by causing the number of revolutions per minute of the spindle, or, as it is generally termed, the "spindle" speed, to vary inversely as the diameter varies, and since the pressure against the cutting-tool for any particular size of cut is the same regardless of the diameter at which the cut is taken, it is obvious that the power required for any particular cutting speed and any particular size of cut will remain the same regardless of the diameter at which the cut is taken. It is also evident from the above that the power will vary directly as the spindle speed for any particular cut, taken at any particular diameter, and that the power will also vary directly as the diameter varies for any particular cut and any particular spindle speed, and, again, that it will vary as the size of the cut for any particular cutting speed. It is evident that the speed of rotation of the spindle or the number of revolutions per minute of the work in order to give the same cutting speed must vary inversely as the diameter of the work—*i. e.*, in order to give the same cutting speed in turning a shaft six inches in diameter the shaft must revolve at twice the number of revolutions per minute as would be required for a shaft twelve inches in diameter. Therefore to cover changes in diameter, the dimensions of the cut and the cutting speed remaining unchanged, as where a roughing cut is taken on a face-plate in a lathe or boring-mill, the power is unchanged, while the spindle speed must be increased as the diameter at which the cut is taken decreases; but to cover variations on cutting speed on any given diameter, the size of the cut remaining the same, the power required varies proportionately to the speed, and means may therefore be employed to reduce the speed of the motor, which at the same time reduces its power. Where reductions in cutting speed only are concerned, the speed may be changed by means of motor regulation. Certain conditions, therefore, require that the total working speed range of the tool be made at constant maximum power—that is, whenever the maximum cut and cutting speed are to be maintained. Other conditions, such as reduced cutting speed or reduced size of the cut or difference in the character of the material worked upon, permit reduced power, which may advantageously be made by means of the motor-controller alone continuously—that is, without the necessity for stopping the machine-tool in passing from one speed to another.

It is the object of my invention to provide the means for meeting all these requirements in the most simple and efficient manner.

More particularly, the object of my invention is to provide an efficient and economical system whereby a shaft may be driven by a motor through a relatively wide range of speeds by means of a novel combination of motor-controller arrangement and alternative gear-trains in such a way that the required power and speed for the great variety of conditions which occur in the use of motor-driven machine-tools, such as lathes and boring-mills, may be obtained in the most economical and convenient manner and with the least outlay in respect of the size of the motor, while preserving all the desirable features of operation.

The object of my invention is, further, to provide a system wherein the steps in the speed obtainable successively with the several trains of gears employed are covered or subdivided by a series of smaller steps obtainable by means of the electrical controller controlling the motor so that a portion of the range of speeds obtainable, using all the different motor speeds with one train of gears, is covered by a portion of the range of speeds obtainable by using the same range of motor speeds in combination with the next succeeding train of gears.

My invention consists in providing a motor and means for controlling the speed of the motor through a certain range, either continuous or divided, into a convenient number of steps and in providing a series of mechanical connections, such as gear-trains for operatively connecting the motor with a driving-shaft, the successive ratios of consecutive speeds obtained with corresponding consecutive gear-trains being preferably equal to each other and substantially less than the total speed range of the motor. In other words, the consecutive trains of gearing will give a series of speeds increasing in geometrical progression and the range covered by any two consecutive trains of gears shall be less than the total speed range of the motor. Only a portion of the total range of the motor will therefore be used in filling the gaps between the successive speeds obtained by the gear-trains. In systems heretofore in use the total speed range of the motor has been less than the ratio of any pair of successive speeds obtainable by the change-gears, in which case the total motor range must be used to fill the gaps between consecutive speeds obtained by the changed gears.

Electric motors may be varied in speed in three ways, first, by varying the number of armature-conductors; second, by varying the strength of the field; third, by varying the impressed voltage at the armature-terminals. The first method is not under discussion. The second method is used to a limited extent and has the following peculiarity—viz., as the speed of the motor is increased by weakening its field the power of the motor is decreased continuously at an increasing ratio and becomes practically $nil$ at an increase of between one hundred per cent. and two hundred per cent., being limited by the sparking at the commutator and by general instability. The third method may be achieved in several ways: First. By introducing resistance in the armature-circuit. This resistance absorbs a portion of the line-voltage, which portion varies directly with the current and therefore with the load on the motor. The remaining voltage impressed at the armature-terminals therefore varies oppositely to the load and causes the speed of the motor also to vary. This method is therefore not applicable where constant speed at any load is required and may be dismissed from consideration. Second. By varying the field strength of the dynamo supplying the current, so that the voltage generated is caused to vary, whereupon the speed of the motor will vary in like manner, remaining practically unchanged during changes in load on the motor. This method gives very close gradations of speed, but requires an individual generator for each motor, and on this account is used only to a very limited extent. Third. By making use of a number of unvarying voltages supplied by a multiwire system. The motor may be driven from any one of these voltages, the number of speeds being the same as the number of different voltages. When a multiwire system is used, intermediate speeds between the voltage speeds are commonly obtained by the introduction of small amounts of armature resistance or by moderate variations in the strength of the motor's field, so that the number of speeds practically obtained may be much greater than the number of voltages. The power and speed of motors driven by the multiwire systems are practically proportional to the voltage, and it results, therefore, that if a wide range of speed is required—as, for instance, six to one—with the further requirement that a given power must be obtained at all points of this range, the size of the motor must be such that it will give this power at its lowest speed. It will therefore usually be inconveniently large and unnecessarily large for the higher speeds. If the motor is used for driving such a machine as a lathe or boring-mill, the required spindle speed range of which is often thirty to one or fifty to one, a number of alternative changes of gearing must be provided for connecting the motor with the spindle of the lathe or boring-mill. Thus a motor whose speed range is six to one, with a transmission through either one of two runs of change-gearing the ratio between which is seven to one, will give a total range at the spindle of forty-two to one, and if three alternative runs of gearing are supplied, the ratios between successive runs being seven to one, as before, the total range at the tool will be two hundred and ninety-four to one.

The disadvantages resulting from operating a motor through a wide range of speed are less with the multiple-wire or multiple-voltage system than with any other; but even with the multiple-voltage system operating a motor through such a wide range of speed as indicated above without the use of change-gears would result in the following disadvantages: First, as stated, the large size of the motor. Second. The presumable necessity of doing a considerable portion of the work at the lower speeds, and therefore on the lower voltages, thereby necessitating the transmission of a large amount of energy at a low voltage, resulting in very-greatly-increased size, weight, and cost of copper for transmission, greatly-increased capacity of controlling mechanism, and inefficiency due either to large generator capacity on the low voltages as well as the high voltages, which generators would often be running under light loads, or to transformation of large amounts of power through considerable range of voltage. Third. Comparative instability of motor speeds under changes of load when running at the lower voltages. This is due to the resistance drop in the armature, with the heavy currents required at the low voltages, being comparatively large when compared with those low voltages themselves. At the higher voltages the lighter currents required for the same power cause the drop due to the armature's resistance to be absolutely much smaller than at the low voltages, while the operating-voltages themselves being higher the relative value of this armature drop to the impressed voltage is very much smaller. The instability in speed due to changes in load varies, in fact, nearly inversely as the square of the speed. Fourth. If the voltage steps of the system are equal in amount, the proportional changes in speed between the lower voltages will be relatively large, requiring a larger number of intermediate steps, to be obtained either by armature resistance or field regulation. If obtained by armature resistance, those intermediate speeds involving larger amounts of resistance will be unstable under variations of load. If obtained by field regulation, the power of the motor at those intermediate speeds where large field regulation is used will be considerably reduced in comparison with the power at those voltage-points. Since these low-voltage points are here assumed to be regular working points, the capacity of the motor will have to be abnormally great to give sufficient power throughout its range. Fifth. If, on the other hand, the voltages are so chosen as to give approximately a geometrical series of speeds, one requiring the same number of intermediate steps between the low-voltage speeds as between the higher ones, the steps in voltage, while small at the lower speeds, will be large at the higher speeds. They will be so large, in fact, as to cause violent rushes of current in the armature, accompanied by sparking and severe mechanical shocks to the transmission-gearing, causing chatter marks in the work when changing from one voltage to another. To overcome these difficulties, I use for the motor's working range only about one-half its total range and provide a sufficient number of alternative gear-trains or change-gears of appropriate ratios to compensate for the shorter working range of the motor, so as to give the same total combined range. Thus, taking, as before, a motor whose total range is six to one and using only the upper part of its range—from full speed to half-speed—as the working range at nominal full power, I provide runs of gearing the ratio between successive pairs of which is 2.3 to 1. If now, for example, four such runs be provided, the total range at the spindle which can be obtained without running the motor below half-speed will be $$2.3 \times 2.3 \times 2.3 \times 2 = 24.3 \text{ to } 1.$$

A further range at reduced powers can be obtained by using the slowest gear and running the motor from one-half speed to one-sixth speed, giving a total range, including this latter portion, of seventy-three to one. Had only three runs of gearing been provided, with the same ratios, the working range at full power would have been $$2.3 \times 2.3 \times 2 = 10.6 \text{ to } 1,$$

and the total range obtained by running the motor on the slowest gear, down to one-sixth of its speed, would be 31.8 to 1.

It is one of the advantages of my invention to be able to provide not only for the full working speed range at full power, but also for its lower extension of range at reduced power, as this portion of the range is extremely useful for certain purposes, although the power drops off proportionately as the speed is reduced, and is therefore less than the amount obtainable at all points where the motor is not reduced below half its speed. This portion may be extremely useful in extending the range of the tool in such operations as taking a finishing cut on a large faceplate, where in order to do the work expeditiously the speed should be frequently changed as the tool travels toward the center and where the best results are obtained by making the cut at one operation without stopping the tool and where at the same time the power required is relatively small.

In order better to explain my invention, reference will now be had to the accompanying drawings, forming a part of this specification, in which—

Figure 1 represents diagrammatically one embodiment of my invention applied to an engine-lathe. Fig. 2 represents a chart for determining the various spindle speeds corresponding to the various controller positions and change-gears. Fig. 3 represents a chart for the purpose of determining the proper gearing ratio and voltage to obtain a given cutting speed with work of a given diameter. Fig. 4 represents a power diagram.

Numeral 1 represents a motor supplied with the current from a four-wire multiple-voltage system, to which it is connected by the controller 2, which has twelve controller positions corresponding to twelve consecutively-increasing speeds of the motor-armature. The particular four-wire system employed is preferably that known as the "arithmetical-voltage" system in which the voltage-steps or differences of potential increase in arithmetical progression and the controller positions 2, 4, 6, 8, 10, and 12 correspond to the six differences of potential obtainable with the arithmetical-voltage system. The intermediate controller positions 1, 3, 5, 7, 9, and 11 are obtained, preferably, by means of suitable field regulation.

3 and 4 represent, respectively, a sprocket-wheel and sprocket-pinion connected by the sprocket-chain 5.

6 represents a shaft on which are loosely mounted the gears 7, 8, and 9, meshing, respectively, with the gears 10, 11, and 12, which are fixed to the spindle 13 of the lathe.

14, 15, and 16 represent clutch-members slidably mounted on the shaft 6 and adapted to engage, respectively, the gears 7, 8, and 9. The sprocket-wheel 3 is mounted on the shaft 17, which carries the pinion 18, meshing with the gear 19 on shaft 6. It is thus seen that the spindle 13 may be driven from the sprocket-pinion 4 through sprocket-wheel 3, pinion 18, gear 19, and thence through either gears 9 and 12, constituting train A, gears 8 and 11, constituting train B, or gears 7 and 10, constituting train C.

Assume that the lathe has a maximum swing of one hundred inches and that it is to be driven by the motor which, operating on a multiple-voltage system having six voltages, the ratios of which are two, four, six, eight, ten, and twelve with intermediate additional speeds so obtained that the resulting total system of motor speeds is proportional to the numbers "1," "2," "3," "4," "5," "6," "7," "8," "9," "10," "11," and "12," these numbers being also the numbers of the controller positions, giving the speeds to which they are proportional. Three alternative trains of gearing A, B, and C are so proportioned that when the motor is running at its maximum speed—say one thousand revolutions per minute—the spindle speed will be when train A is used 4.6 revolutions per minute, when gear B is used 10.29 revolutions per minute, and when gear C is used twenty-three revolutions per minute, the ratios between these successive trains being 2.22 to 1.

The chart shown in Fig. 2 is laid out to show on the horizontal axis the spindle speeds of the tool in revolutions per minute and on the vertical axis the gearing ratios from motor to spindle, the three ratios chosen—namely, A, B, and C—being specially marked. Through the point on the vertical axis corresponding to the gear ratio C is drawn a horizontal line whose length is proportional to the speed of the spindle when the controller-handle occupies position 12—that is, when the motor is driven at its maximum speed (one thousand revolutions per minute) and when gear-train C is employed. Twelve points are located on this line corresponding to the twelve controller positions and are indicated by the numbers from "1" to "12," consecutively. Through the points corresponding to the gear ratios A and B are drawn two other horizontal lines, and these are intersected by radiating lines drawn from the intersection of the horizontal and vertical axes to the points on the upper horizontal line corresponding to the different controller positions. The intersections of these radiating lines with the horizontal gear-ratio lines are distant from the vertical axis an amount proportional to the spindle speed corresponding to the gear-ratio line and controller-position line forming the intersection and these intersections projected down upon the horizontal axis on the scale "spindle-speed revolutions per minute" give the corresponding speed of the spindle. These intersections have been projected from the speed-range lines for the gear-trains A, B, and C for a few controller positions only, the others being omitted in order not to confuse the chart. On each speed-range line that portion corresponding to the motor range is heavily shaded. This is the working range through which the motor will be called on for nominal power. The lower portion (not shaded) may be used when the power requirements are low. It will be seen that the total range at nominal power, including the three gears, is from twenty-three revolutions per minute to 2.3 revolutions per minute, or a range of ten to one. A further reduction in speed from 2.3 revolutions per minute down to 0.766 revolutions per minute is obtained at reduced power. The maximum diameter being one hundred inches, it will be found by simple computation that the range from twenty-three revolutions per minute to 2.3 revolutions per minute at nominal power corresponds to a range from ten inches diameter at sixty feet per minute to one hundred inches diameter at sixty feet per minute. This is the range of diameters through which it is desirable to operate the tool at the maximum cutting speed of sixty feet per minute. Since no larger diameter than one hundred inches can be swung in the lathe, the further reduction in speed from twenty-three revolutions per minute to 0.766 revolutions per minute can correspond only to lower cutting speeds on the one-hundred-inch diameter and therefore to reduced power requirements. Through this range, as through the higher ranges, the motor is still capable of filling all demands which can be made upon it without exceeding the prescribed cut and feed.

The facts as to cutting speeds, diameters, and gear ratios are set forth in the chart, Fig. 3. The left-hand part of this figure is a table headed "Gear combinations for various diameters of work," under which are three columns for the three gear combinations A, B, and C, respectively, in which are given diameters in inches. The lines upon which these diameters lie extend to the right through a portion of the chart characterized by radiating lines, numbered "1" to "12," referring to the controller positions. This portion of the chart has at the top a range of cutting speeds from nothing to seventy-five feet per minute. Assuming any diameter between ten and one hundred inches, the column headed "Gear combination" in which it is found indicates the gear which is to be used in working upon that diameter. Following the faint line to the right and reading downward along the vertical line from the desired cutting speed, the intersection indicates the controller position to be used to give this cutting speed on the diameter chosen with the gear combination designated. If the intersection does not lie exactly on a controller-position line, the nearest controller position will give the nearest cutting speed to that actually desired that can be obtained. In practice it is found that cutting speeds cannot be accurately judged nor used closer than ten per cent. to fifteen per cent., so that all practical purposes are served by the system, as shown. It will be seen that many diameters can be worked at the low cutting speeds more than one gear. This is in conformity to the fact, noticeable in Chart 1, that some of the lower speeds are obtained on more than one gear; but it will be remembered that the lower cutting speeds in every case correspond to smaller power requirements and can therefore be obtained satisfactorily on the lower voltages. This is a decided advantage in that if it be desired to face a large piece of work—for instance, a face-plate from ten inches to one hundred inches in diameter—at sixty feet per minute, the roughing cut can be taken at nominal power and maximum size of cut by working the motor from full speed to half speed and then changing to the next lower gear. The finishing cut, which may require to be taken without such a stop as is necessary for changing gears, is a light cut, requiring very little power, and can therefore be made through the full motor range, working down to the lower voltages.

By the expression "gear ratio" or "gear-train ratio" as herein used is meant the ratio of the speeds produced by consecutive trains of gearing, and by the expression "motor range" is meant the range from the highest to the lowest speeds at which the motor may be run. The motor range may be expressed or measured by the ratio of its highest speed to its lowest. Thus if $a_2$ and $a_1$ equal the highest and lowest speeds at which the motor may be run $\frac{a_2}{a_1}$ will represent the total motor range and if $r_1$ represents the lowest gear-train—$i.\ e.$, the gear-train giving the greatest speed reduction—and $r_2\ r_3\ r_4$, &c., represent the succeeding successively-increasing gear-trains, then $\frac{r_2}{r_1}\frac{r_3}{r_2}\frac{r_4}{r_3}$, &c., will represent the succesive gear ratios. In most cases I prefer to make the successive gear ratios equal, in which case the resulting spindle speeds for any particular motor speed will increase in geometrical progression. The condition of having the gear-trains "overlap" the motor range may be expressed by saying that the speed obtained by employing the highest motor speed with any particular gear-train shall be greater than that obtained by using the lowest motor speed in combination with the next succeeding gear-train, or, again, this may be expressed in symbols, as follows: $a_2 r_1 > a_1 r_2$, and if we divide both terms of this expression by $a_1 r_1$ we have $\frac{a_2}{a_1} > \frac{r_2}{r_1}$—$i.\ e.$, the total motor range must be greater than the gear-train ratio. Of course to obtain substantial benefits from this system the motor range must be substantially greater than the gear ratio, and to obtain the best results I have found in practice that the gear ratio should be from one-third to two-thirds of the total motor range.

Having thus described my invention, what I claim is—

1. In a system of speed regulation for motor-driven machinery, the combination with a motor and means for supplying current thereto to drive said motor at various speeds covering a predetermined range, of a driven shaft, a plurality of trains of gears adapted to connect said motor to said driven shaft, the velocity ratios of said gear-trains being proportioned so that the entire range of speeds obtainable with each successive train, beginning with the slowest, covers a portion of the range obtainable with the next succeeding faster train.

2. In a system of speed regulation for motor-driven machinery, the combination with a motor and means for supplying current thereto to drive said motor at various speeds covering a predetermined range, of a driven shaft, a plurality of gears adapted to connect said motor to said driven shaft, the speeds obtainable with each successive gear-train, beginning with the slowest, covering substantially from one-third to two-thirds of the range of the next succeeding faster train.

3. In a system of speed regulation, for motor-driven machinery, the combination with a motor and means for supplying current thereto to drive said motor at various speeds covering a predetermined range, of a driven shaft, a plurality of trains of gears adapted to connect said motor to said driven shaft, the velocity ratios between the motor and the driven shaft of the several trains of gears increasing successively in geometrical ratio by overlapping steps.

4. In a system of speed regulation for motor-driven machinery, the combination with a motor and a controller regulating the current supplied to said motor, the controller-handle of said controller adapted to occupy a plurality of positions in which said motor is caused to run at a plurality of corresponding speeds, of a driven shaft and a plurality of trains of gears connecting said driven shaft and said motor, said trains of gears being proportioned to give successively increasing velocity ratios between said motor and said driven shaft, such that the lower portion of the range of speeds obtainable with one train of gears is also obtainable with the higher portion of the range of speeds obtainable with the next succeeding train.

5. In a system of speed regulation the combination with a motor and means for regulating the speed of said motor through a predetermined range, of a driven shaft, a plurality of alternative trains of gears connecting said motor to said driven shaft proportioned to give a plurality of successively-increasing velocity ratios between said motor and said driven shaft such that a portion of the range of speeds obtainable with one train of gears is covered by a portion of the range of speeds obtainable with the next succeeding train.

6. In a system of speed regulation the combination with a motor and means for regulating the speed of said motor through a predetermined range, of a driven shaft, a plurality of alternative trains of gears connecting said motor to said driven shaft proportioned to give a plurality of velocity ratios between said motor and said driven shaft, increasing successively in geometrical proportion, and such that the range of speeds obtainable with one train of gears overlaps a portion of the range obtainable with the next succeeding train.

7. In a system of speed regulation for motor-driven machinery the combination with a motor and means for driving said motor through a predetermined range of speeds of a driven shaft and plurality of trains of gearing adapted to alternatively connect said motor to said driven shaft, the ratios of said trains taken in pairs consecutively proportioned to be substantially less than the ratio of the highest motor speed to the lowest motor speed.

8. In a system of speed regulation for motor-driven machinery the combination with a motor and means for running said motor through a predetermined range of speeds of a driven shaft a plurality of alternative trains of gears adapted to connect said motor with said driven shaft, the gear ratios of said trains of gears taken in pairs consecutively, being equal and substantially less than the total speed range of the motor expressed by the ratio of its highest to its lowest speed.

In testimony whereof I have signed my name to this specification in the presence of two subscribing witnesses.

GANO S. DUNN.

Witnesses:
   H. A. KNOENER,
   M. E. SAMMIS.